(12) United States Patent
Schneider et al.

(10) Patent No.: US 10,358,122 B2
(45) Date of Patent: Jul. 23, 2019

(54) PARKING BRAKE ACTUATION METHOD FOR AN ELECTRIC MOTOR VEHICLE PARKING BRAKE SYSTEM

(71) Applicant: Continental Teves AG & Co. oHG, Frankfurt (DE)

(72) Inventors: Heinz-Anton Schneider, Niedernhausen (DE); Christof Maron, Usingen (DE)

(73) Assignee: Continental Teves AG & Co. oHG, Frankfurt (DE)

(*) Notice: Subject to any disclaimer, the term of this patent is extended or adjusted under 35 U.S.C. 154(b) by 19 days.

(21) Appl. No.: 15/885,321

(22) Filed: Jan. 31, 2018

(65) Prior Publication Data

US 2018/0154879 A1 Jun. 7, 2018

Related U.S. Application Data

(63) Continuation of application No. PCT/EP2016/066599, filed on Jul. 13, 2016.

(30) Foreign Application Priority Data

Jul. 31, 2015 (DE) .................. 10 2015 214 715

(51) Int. Cl.
| | | |
|---|---|---|
| B60T 13/74 | (2006.01) | |
| F16D 51/22 | (2006.01) | |
| F16D 51/50 | (2006.01) | |
| F16D 65/22 | (2006.01) | |
| F16D 121/24 | (2012.01) | |
| F16D 121/14 | (2012.01) | |

(Continued)

(52) U.S. Cl.
CPC .......... *B60T 13/741* (2013.01); *B60T 13/746* (2013.01); *F16D 51/22* (2013.01); *F16D 51/50* (2013.01); *F16D 65/22* (2013.01); *F16D 2121/14* (2013.01); *F16D 2121/24* (2013.01); *F16D 2125/60* (2013.01); *F16D 2127/06* (2013.01)

(58) Field of Classification Search
CPC ...... B60T 13/741; B60T 13/746; F16D 51/22; F16D 51/50; F16D 65/22; F16D 2121/14
See application file for complete search history.

(56) References Cited

U.S. PATENT DOCUMENTS

| | | | | |
|---|---|---|---|---|
| 2002/0066626 A1* | 6/2002 | Gill | ................... | B60T 7/107 188/158 |
| 2003/0066714 A1* | 4/2003 | Flynn | ................. | B60T 7/107 188/2 D |

FOREIGN PATENT DOCUMENTS

| | | |
|---|---|---|
| CN | 103895518 A | 7/2014 |
| DE | 102007035541 A1 | 2/2008 |

(Continued)

OTHER PUBLICATIONS

International Search Report and Written Opinion dated Oct. 11, 2016 from corresponding International Patent Application No. PCT/EP2016/066599.

*Primary Examiner* — Vishal R Sahni

(57) ABSTRACT

An electric-motor-operated parking brake system carries out metered actuation without a force and travel sensor. A control unit initiates a primary tensioning process with observation of the current, and wherein secondary or tertiary tensioning processes with increased brake application force are executed exclusively automatically by the control unit if monitoring of the stationary state during an energization interval detects an undesired vehicle movement.

14 Claims, 2 Drawing Sheets

(51) Int. Cl.
*F16D 125/60* (2012.01)
*F16D 127/06* (2012.01)

(56) References Cited

FOREIGN PATENT DOCUMENTS

| | | |
|---|---|---|
| DE | 102007043634 A1 | 3/2008 |
| DE | 102012201579 A1 | 8/2012 |
| EP | 0966376 A1 | 12/1999 |
| EP | 0996376 B1 | 5/2000 |
| JP | H10110758 A | 4/1998 |
| JP | 2006131151 A | 5/2006 |
| JP | 2009103176 A | 5/2009 |
| JP | 2014504711 A | 2/2014 |
| KR | 1020140012985 A | 2/2014 |
| WO | 03100282 A1 | 12/2003 |
| WO | 2009/044908 A2 | 4/2009 |

\* cited by examiner

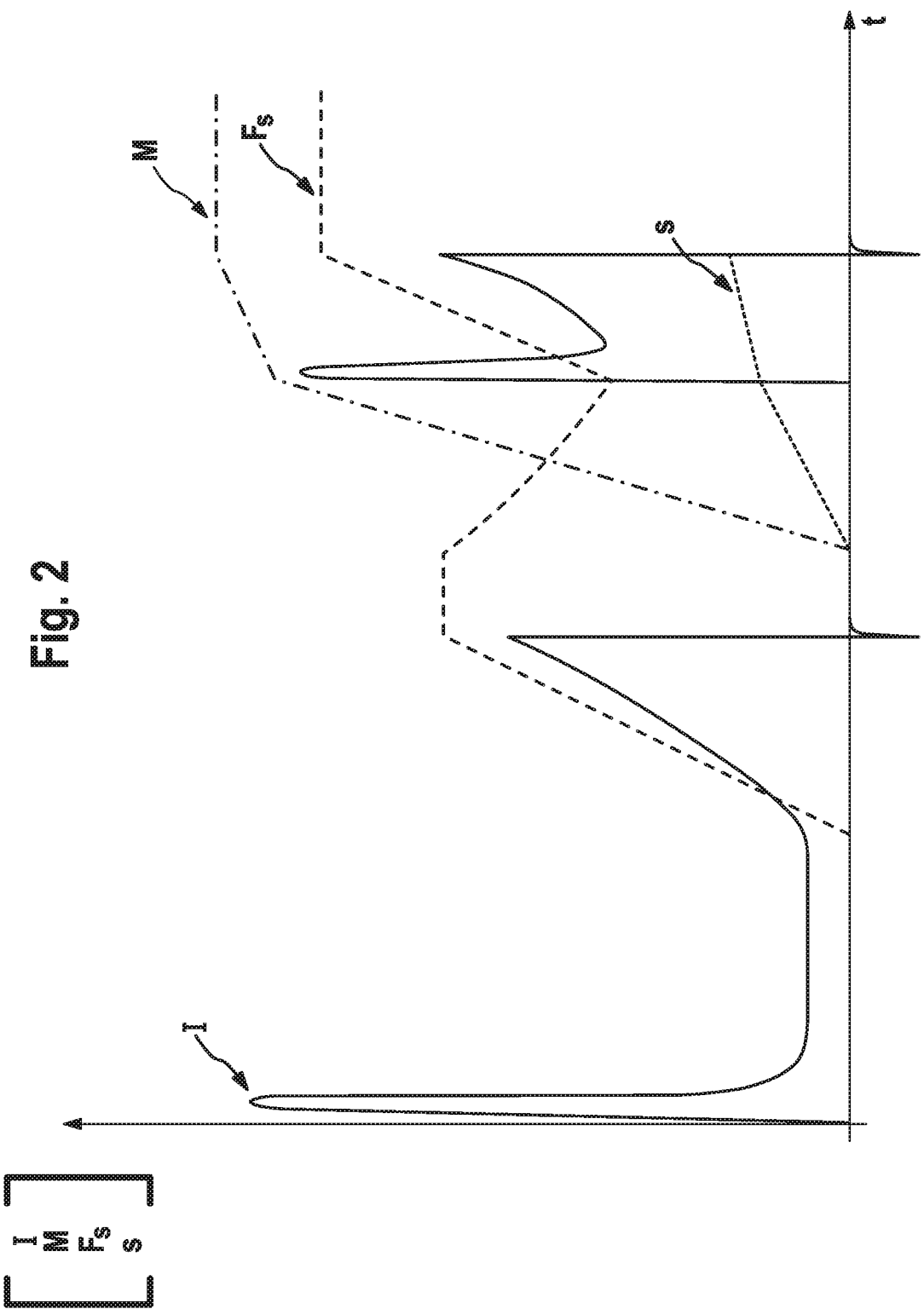

PARKING BRAKE ACTUATION METHOD FOR AN ELECTRIC MOTOR VEHICLE PARKING BRAKE SYSTEM

CROSS-REFERENCE TO RELATED APPLICATIONS

This application claims the benefit of International application No. PCT/EP2016/066599, filed Jul. 13, 2016, which claims priority to German patent application No. 10 2015 214 715.0, filed Jul. 31, 2015, each of which is hereby incorporated by reference.

TECHNICAL FIELD

This invention relates to wheel brake actuators which are actuated by electric motor and include a drum brake system of the duo-servo type for a motor vehicle.

BACKGROUND

A wheel brake actuator is known which is actuated by electric motor and includes a pretensioned spring element and a drum brake system of the duo-servo type for a motor vehicle, and requires an operating method which detects or senses significant changes in the power drain of the electric motor actuator during the application and release of the brakes in order to determine specific values of the arresting force using the spring element (DE 10 2007 035 541 A1).

The parking operation of a vehicle with a hot wheel brake, in particular on a slope, can result in changes in the brake application force owing to cooling. In this context, disc brakes generally experience a loss of brake application force, while drum brakes are basically subject to an increase in brake application force. In drum brakes, there is an additional aggravating factor that for structural reasons said brakes may have self-boosting effects which are different depending on the direction of rotation, which become manifest during the cooling of the wheel brake with respect to the change in the brake application force in an opposite direction.

In addition, in the case of duo-servo drum brake systems, in particular stick-slip effects are known in which the brake shoes temporarily adhere to or slip on the brake drum. These facts can cause undesired irregularities in the detection of current, which makes filtering necessary.

In order to implement a quasi-elastic force effect of the brake shoes on the brake drum in conjunction with a comprehensive monitoring function, a specific central actuating unit is known, with an activation cable and two couplings to wheel brakes, in which the spring-elastic lengthening of the actuation cable is utilized, as it were, as a reversible energy store by the central actuating unit (EP 966 376 B1). However, in such systems, two sensors are prescribed for monitoring the activation cable, and correspondingly extensive signal processing operations in a control unit are prescribed.

In order to prevent an undesired release of the brakes, it has to a certain extent also already been proposed to monitor automatically, that is to say independently of the driver, a vehicle state or the state of the wheel brake at least within defined time periods after the parking operation—what is referred to as the overrun time—by means of an electronic control unit, and where necessary to retension the parking brake actuator system automatically. It goes without saying that this automatic operation additionally places demands on the electrical power supply, that is to say on the vehicle on-board power system, which can actually be tolerated only in conjunction with an unlimited electrical energy supply.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The present invention is therefore based on the object of ensuring currentless parking of a motor vehicle with an electric parking brake more reliably and favorably than hitherto while dispensing with a force or travel measuring sensor system.

An electronically open-loop or closed-loop controlled parking brake actuation method is described, wherein a) the control unit always executes and terminates a primary tensioning process of the wheel brake actuator in the cable tensioning process with continued observation of the power demand, wherein when the primary tensioning process is terminated the cable pull tension always correlates with a lower cable pull tension than a preset minimum cable pull tension, b) after the termination, over a chronologically limited time period, the control unit executes checking of the stationary state of the motor vehicle using measured or determined vehicle sensor data, c) the control unit evaluates the result of the checking of the stationary state on the basis of stored criteria, and wherein d) the control unit automatically triggers a secondary tensioning process with renewed actuator energization and observation of the current only subsequent to a result of the checking of the stationary state which is evaluated as faulty or inadequate, and the energization in the secondary tensioning process correlates with at least approximately 90% of the preset minimum cable pull tension, before e) final termination of the energization takes place.

Parking is performed with open-loop or closed-loop control according to demand. At the same time, the electrical demand made of the on-board power system and the mechanical stressing of components are reduced without compromising safety. In this context, the cable pull tension when the primary tensioning process is terminated correlates with at least approximately 60% of the preset minimum cable pull tension.

In a further refinement of the present invention, in order to protect the parking operation there is provision that if the energization of the wheel brake actuator has terminated after the secondary tensioning process, the control unit executes secondary checking of the stationary state of the motor vehicle over a chronologically limited time period. Accordingly, safety is obtained in that faults during the parking operation are automatically detected and can be automatically eliminated by exceptional retensioning.

The elimination of faults during the parking operation is promoted if, after a result of the secondary checking of the stationary state which is evaluated as faulty or inadequate, the control unit automatically triggers a tertiary tensioning process with renewed actuator energization and observation of the current, and wherein the energization in the tertiary tensioning process correlates with at least approximately 120% of the minimum cable pull tension.

Both the software treatment and the industrial approval system are made more efficient if the control unit has at least one vehicle sensor set point data set as a fixed evaluation criterion in a separately protected program module, which vehicle sensor set point data set correlates with at least one secure vehicle parking profile of the generic motor vehicle, and the program module automatically compares measured or acquired vehicle sensor data of the motor vehicle with the stored vehicle sensor set point data set/sets for checking of the stationary state.

A contribution is made to bringing about efficient adaptation to a preset vehicle architecture if a stored vehicle sensor set point data set and/or the executed checking of the stationary state include/includes at least one inclination angle information item and a wheel rotational information item which correlates with the inclination angle information item.

It is considered necessary and sufficient if the chronologically limited time period for checking of the stationary state is at least approximately 70 ms during a computing process time of the control unit of approximately 7 ms. Accordingly, the brake system can reliably permit, as a function of the design, state and maintenance of the connected periphery, the parking operation of the vehicle to be safely, reliably and efficiently concluded subsequent to a brake actuation request or subsequent to external actuation within less than three seconds, including the transfer into the currentless self-locking state.

The respective chronologically limited time period for checking of the stationary state of the motor vehicle can take here, for example, approximately one second, wherein, after the checking of the stationary state has been evaluated as faulty, that is to say after the input of "undesired" wheel rotational information in the limited time period, the control unit automatically causes either the secondary tensioning process or the tertiary tensioning process to be executed.

For the rare fault situation in which a tertiary tensioning process has been executed without success, an electronic fault message can be output, in particular in a wireless fashion, about an inadequately protected parking process of the vehicle to the vehicle driver and/or to other addressees such as, for example, to adjacent road users, passersby or auxiliary personnel. By means of this measure it is possible to provide, from outside the vehicle, a countermeasure or assistance, and adjacent road users are as a result given, for example, the opportunity to make provision of countermeasures sufficiently quickly in order to avoid consequential damage by vehicles which are not safely parked.

A stored minimum cable pull tension is provided such that it can be adapted differently as a function of the measured or sensed vehicle load state (vehicle payload and/or trailer load).

In addition, at least two differently stored minimum cable pull tensions for the drum brakes of a common vehicle axle are provided in a way such that they can be varied in a defined fashion as a function of their positioning, such as, in particular, a self-boosting effect or rotational position, and/or as a function of their relationship with the respective slope, that is to say uphill, downhill, pointing downhill or pointing uphill.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The invention will be explained in more detail with reference to the drawing in which an embodiment of the invention is illustrated. In the drawing, in each case schematically:

FIG. 2 shows a qualitative sketch of the synchronous profiles for representing the actuator current demand I, braking torque M, cable tensioning force Fs and vehicle rolling distance s, in each case plotted against the time t, during the actuation method according to the invention.

DETAILED DESCRIPTION

Figure 1:
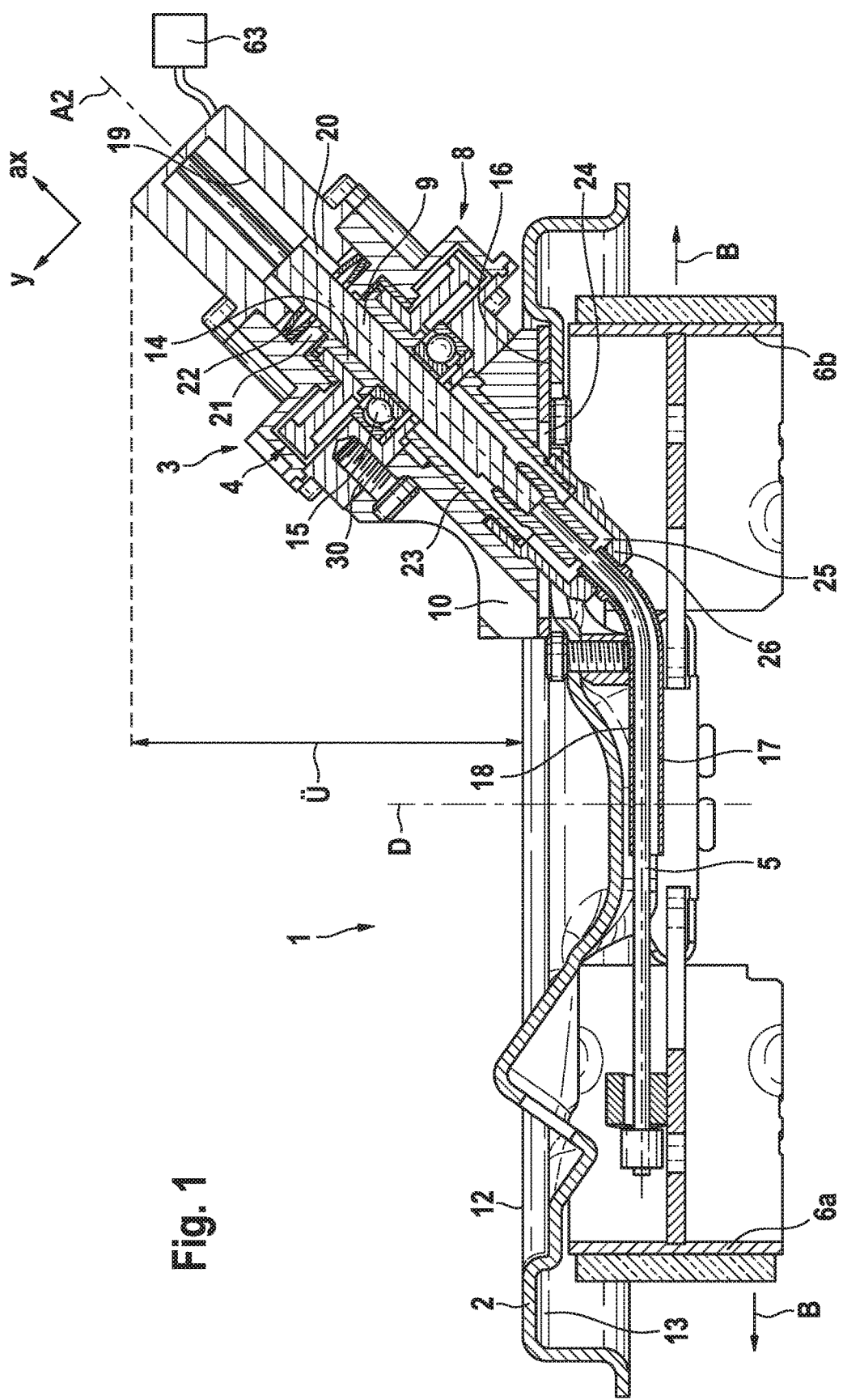
FIG. 1 shows, by way of example, a sensorless wheel brake actuator system from the prior art and has a short traction cable, which wheel brake actuator system is suitable to be actuated with a parking brake actuation method.

At least one initial tensioning process or primary tensioning process is provided by the traction cable. Then, in principle a further, secondary tensioning process or another additional tertiary tensioning process can be carried out on the traction cable.

An exemplary tensioning process of an electric parking brake takes place as follows. A first primary/initial tensioning process ends at a level of approximately 80 percent of the necessary tractive force.

An undesired movement of the vehicle is monitored and evaluated in a sensitive fashion during and after the primary tensioning process. If an unsuitable movement of the vehicle is sensed within the scope of the monitoring of the stationary state, which movement for example does not correspond to a customary, previously known, stored movement profile of a vehicle with an actuated duo-servo brake at a defined inclination angle, a second, secondary tensioning process is triggered at the electric actuator. A defined, increased tractive force, which is suitably assigned to the detected inclination angle or the state of the vehicle, is applied to the traction cable. For example, the tension in the secondary tensioning process corresponds to 90% of a predefined minimum tension.

If, for example, a vehicle movement is detected after a primary tensioning process, it is often not unambiguously clear whether the brake shoes are still adhering to the brake drum or not, and whether a reduction in the holding torque is to be expected. The reaction time of a customary electric actuator is, however, usually at least approximately 70 ms. Depending on the rigidity of the overall system, the tractive force on the traction cable can, to some extent, be increased considerably above the actually required amount in 70 ms. Therefore, it is necessary to ensure in each case that there is a sufficient interval in terms of time and force between the primary tensioning process, secondary tensioning process and tertiary tensioning process.

If no undesired vehicle movement and no actuation of the service brake is registered within a defined time period of, for example, approximately one second after a primary tensioning process has been carried out, the energization is terminated, that is to say that there is currentless self-locking. However, it is also possible for a secondary tensioning process to be triggered at the actuator for providing additional protection, which secondary tensioning process applies a yet further increased tractive tension to the traction cable.

The the brake application force can be metered appropriately for demand during the parking operation. As a result of the demand-appropriate actuation, an actuator does not have to be actuated continuously and usually unnecessarily with an overload, or even does not have to be configured in an overdimensioned fashion. In other words, the first time an actuator can be configured to have smaller dimensions or less powerful dimensions. As result, the risk of damage owing to overloading or material fatigue is appropriately decreased.

It is possible to reduce the number of individual brake application processes in that a plurality of brake application forces/tensions which are assigned to the inclination angles or the vehicle payload are preset. This decreases the loading of the hardware components involved and reduces a reaction time up to the perceptible holding effect.

The parking brake system permits use of standardized components of a conventional mechanical duo-servo brake to be used. It is possible to dispense with additional components such as, in particular, elastic elements in the sense of a brake application force reservoir as in the case of spring-loaded brakes of utility vehicles.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A parking brake actuation method for an electric-motor-operated motor vehicle parking brake system comprising:
   transmitting movement via a transmission element, a spreading device and a traction cable from each of a plurality of electromechanical wheel brake actuators to each of a plurality of brake shoes which are each associated with a duo-servo type drum brake;
   observing and regulating the power demand of each of the plurality of wheel brake actuators on a wheel-specific base with a central electronic control unit for performing one of open-loop and closed-loop control of the traction cable tension;
   terminating the energization of the respective wheel brake actuator with said control unit after detection of a defined preset cable tension and transferring said wheel brake actuator into a currentless self-locking state;
   executing a primary tensioning process of the respective wheel brake actuator in the cable tensioning process with continued observation of the power demand with said control unit,
   terminating the primary tensioning process at a first percentage of a preset minimum cable pull tension;
   checking of the stationary state of the motor vehicle with the control unit using one of measured and determined vehicle sensor data when energization of the wheel brake actuator has been terminated, wherein said checking is over a chronologically limited time period;
   evaluating with the control unit the result of the checking of the stationary state on the basis of stored criteria;
   triggering automatically a secondary tensioning process with renewed actuator energization and observation of the current subsequent to a faulty or inadequate result from the checking of the stationary state, and
   wherein energizing in the secondary tensioning process correlates with a second percentage of a preset minimum cable pull tension, wherein said second percentage is greater than said first percentage.

2. The parking brake actuation method as claimed in claim 1, wherein the first percentage is 60% of the minimum cable pull tension and the second percentage is at least 90% of the minimum cable pull tension.

3. The parking brake actuation method as claimed in claim 1, further comprising executing secondary checking of the stationary state of the motor vehicle with the control unit over a chronologically limited time period when the energization of the wheel brake actuator has terminated after the secondary tensioning process.

4. The parking brake actuation method as claimed in claim 3, further comprising triggering automatically a tertiary tensioning process with renewed actuator energization and observation of the current after a faulty or inadequate result from the secondary checking of the stationary state.

5. The parking brake actuation method as claimed in claim 4, wherein the energization in the tertiary tensioning process correlates with at least 120% of the minimum cable pull tension.

6. The parking brake actuation method as claimed in claim 4, wherein the chronologically limited time period is at least approximately one second, and wherein after a fault-free result of the checking of the stationary state the control unit regularly causes on of the secondary tensioning process and the tertiary tensioning process to be executed.

7. The parking brake actuation method as claimed in claim 1, wherein the control unit has at least one vehicle sensor set point data set stored as a fixed evaluation criterion in a separately protected program module, and wherein the vehicle sensor set point data set correlates with at least one secure vehicle parking profile of the generic motor vehicle.

8. The parking brake actuation method as claimed in claim 7, wherein the program module automatically compares one of measured and acquired vehicle sensor data of the motor vehicle with the at least one stored vehicle sensor set point data set for checking of the stationary state.

9. The parking brake actuation method as claimed in claim 7, wherein the at least one stored vehicle sensor set point data set includes at least one inclination angle information item and a wheel rotation information item which is correlated therewith.

10. The parking brake actuation method as claimed in claim 1, wherein the chronologically limited time period for checking of the stationary state is at least approximately 70 ms during a computing process time of the control unit of approximately 7 ms.

11. The parking brake actuation method as claimed in claim 1, wherein the stored minimum cable pull tension is provided such that the stored minimum cable pull tension can be varied as a function of one of a measured and determined vehicle inclination angle.

12. The parking brake actuation method as claimed in claim 1, wherein at least two differently stored minimum cable pull tensions for the drum brakes of a common vehicle axle are provided such that the at least two differently stored minimum cable pull tensions can be varied as a function of their positioning.

13. The parking brake actuation method as claimed in claim 12, wherein said variation as a function of positioning is one of a self-boosting effect, a rotational position, and a function of the at least two differently stored minimum cable pull tensions with a respective slope of the vehicle.

14. The parking brake actuation method as claimed in claim 13, wherein the respective slope is one of uphill, downhill, pointing downhill and pointing uphill.

* * * * *